Jan. 7, 1936.  G. W. RAPPOLD  2,027,198
SLICE MEASURING CAKE BOX
Filed Aug. 10, 1934
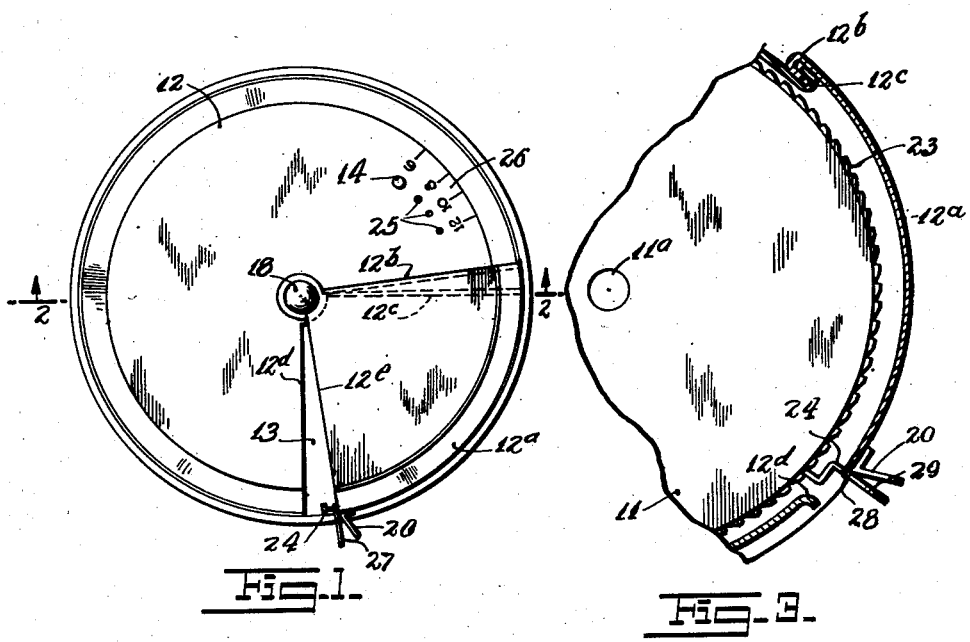
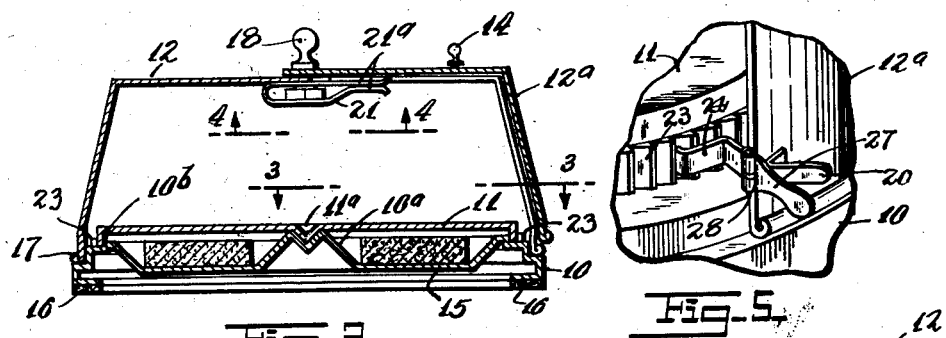
INVENTOR
GEORGE W. RAPPOLD
BY
ATTORNEY Patented Jan. 7, 1936

2,027,198

UNITED STATES PATENT OFFICE 2,027,198

SLICE MEASURING CAKE BOX

George W. Rappold, Maspath, N. Y.

Application August 10, 1934, Serial No. 739,321

6 Claims. (Cl. 45—133)

This invention relates to new and useful improvements in a slice measuring cake box.

The invention has for an object the construction of a device as mentioned which is characterized by the provision of a disc rotatively centrally supported on a base and adapted to support a cake or the like, and associated with a removable cover having a slidable cover section, and stops adjustable in such a manner that predetermined sizes of cuts may be taken from the cake.

More particularly, the invention proposes the provision of a mechanism for automatically turning the disc to move the cake into new positions for new cuts each time that a cut has been made.

As another object of this invention it is proposed to arrange the disc with a notched rim and to provide the slidable section of the cover with a mechanism engaging the notches and arranged so as to turn the disc when the cover section is moved back to its initial closed position.

The invention also proposes an arrangement whereby the disc is not turned when the cover section is moved to its open position. The construction is such that the cake is turned to a new position when the cover section is closed and maintains its position after the cover section is opened to permit a new cut of cake.

Another one of the objects of this invention is to arrange a mechanism for holding the disc against accidental motion and associated with a ratchet upon the cover section in such a manner that the ratchet may be moved from an inoperative to an operative position as desired.

Still further, the invention also proposes to equip the cake box with a humidifying pad, and with a holder for a knife.

Still further the invention proposes the construction of a device as mentioned which is of simple durable construction and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a plan view of a device constructed according to this invention.

Fig. 2 is a vertical sectional view taken on the line 2—2 of Fig. 1.

Fig. 3 is a fragmentary horizontal sectional view taken on the line 3—3 of Fig. 2.

Fig. 4 is a fragmentary horizontal view looking in the direction of the line 4—4 of Fig. 2.

Fig. 5 is a fragmentary perspective view of a portion of Fig. 1 illustrating the ratchet on the slidable cover section cooperating with the notched rim of the disc.

Fig. 6 is a fragmentary vertical sectional view of a device constructed according to a modification of the invention.

The slice measuring cake box, according to this invention, comprises a base 10 supporting rotatively a disc 11 which is adapted to support a cake or the like. A removable cover 12 is arranged upon the base for covering the cake and has a sector shaped opening 13. A slidable section 12ᵃ is arranged on the cover 12 and is adapted for closing the sector shaped opening 13. A stop 14 is adjustably mounted upon the cover for limiting motion of the slidable cover section to locate the size of cut of said cake.

The base 10 is formed of sheet metal stamped to have a central raised portion 10ᵃ with a depressed top into which a depressed portion 11ᵃ of the disc 11 engages for the rotative supporting of the disc. The base 10 is formed with an annular depressed portion around the raised portion 10ᵃ holding an annular humidifying pad 15. The periphery of the base 10 is formed with a raised portion 10ᵇ located immediately below the edge of the disc so as to prevent the disc from tipping over. A felt bottom 16 is attached along the edge of the base to protect furniture and objects upon which the device may be rested.

The cover 12 is formed with a bottom lower edge 17 adapted to clamp upon a raised area at the corner of the base 10 to join these parts frictionally in a unit. The slidable cover section 12ᵃ is of sector shape and is pivotally attached with a bolt and nut 18 arranged through the center of the top of the cover. The overlapping edges 12ᵇ and 12ᶜ of the cover and cover section are bent towards each other, as clearly illustrated in Fig. 3, so as to form a substantially air tight joint when the cover section is in the closed position.

A handle 20 is attached upon one end of the cover section 12ᵃ by which it may be readily moved. The adjacent edges 12ᵈ and 12ᵉ of the cover and cover sections are formed with bent portions adapted to overlap or engage each other tightly to help close the cake box. A knife supporting clip 21 is attached upon the underside of the top of the cover, with the bolt and nut 18, and is for the purpose of supporting a knife. This clip 21 has contacting free edges 21ᵃ between which a knife may be inserted. The periphery of the disc 11 is formed with notches 23 adapted to coact with a ratchet 24 mounted upon the cover section 12a and arranged in such a manner that the disc 11 is rotated when the cover section is moved in one direction but is not disturbed when the cover section is moved in the other direction.

More particularly, the notches 23 and the ratchet 24 are so arranged that the disc 11 is turned when the cover section is moved to the closed position and these parts merely idle when the cover section is moved to the open position. The top of the cover 12 is formed with several openings 25 arranged in a line and adapted to receive the peg 14 to limit the opening of the cover section. A scale 26 is associated with the openings 25 to designate the size of the cut. As illustrated in Fig. 1 the scale designates cuts ranging from six to the cake to twelve to the cake.

In Fig. 5 the ratchet arrangement 24 of the invention is clearly disclosed. The ratchet has a handle portion associated in such a manner therewith that the disc 11 is positively correctly operated. More particularly, the cover section 12a supports the handle portion 27 which is pivotally mounted upon a lug 28 arranged on the edge of the cover section in such a manner that the handle portion pivots about a vertical axis. The handle portion 27 is formed with a rear extension constituting the ratchet 24 which engages the notches 23 of the disc. The ratchet 24 is extended in the direction of closing of the cover section. It will be noted that when the handle 27 is moved to close the cover section the ratchet 24 will be pivoted into operative position to turn the disc 11. When the cover section 12a is moved into the open position with the handle 27, the ratchet 24 will be pivoted to an inoperative position so as not to touch the notches 23.

In Fig. 6 another embodiment of the invention has been disclosed wherein the device is provided with a disc 11c for the holding of the cake, and this disc is formed with notches 23a upon the periphery, and notches 23b at the bottom edge of the periphery. The notches 23b are engaged with pawls 30 fixed upon the base 10c. The arrangement is such that the pawls 30 hold the disc 11c from free turning. The cover section 12a is provided with a lug 28 at one edge upon which there is mounted a handle 27a pivotally mounted and which continues into a ratchet 29a. The handle and ratchet are pivotally mounted on a headed stud 32.

A spring 33 is arranged upon the stud 32 and acts between the head of the stud and the handle and ratchet (27a and 29a) so as to normally urge this ratchet into a raised position in which the ratchet cannot engage the notches 23a. It will be noticed that the cover section may be opened and closed with the handle 27 without interfering with the disc. If it is desired that the disc be turned it is necessary that the handle 27 be moved downwards against the action of the spring 33. In the lowered position of the handle the ratchet 29a is engageable with the notches 23a. In addition, the handle and ratchet is capable of pivoting and operating in the fashion described relative to Fig. 5.

It is to be understood that the base, cover and other parts of the cake box may be made of metal, glass or any other suitable material.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a slice measuring device, a base, a disc rotatively centrally supported on the base and adapted to support a cake or the like, a removable cover on said base for covering said cake and having a sector shaped opening, a slidable cover section on said cover for covering said sector shaped opening, a stop for limiting opening of said slidable cover section to the size of the cut of said cake, and means for turning said disc when the cover section is moved in one direction, comprising a ratchet on said slidable cover section engageable with notches upon the rim of said disc.

2. In a slice measuring device, a base, a disc rotatively centrally supported on the base and adapted to support a cake or the like, a removable cover on said base for covering said cake and having a sector shaped opening, a slidable cover section on said cover for covering said sector shaped opening, a stop for limiting opening of said slidable cover section to the size of the cut of said cake, and means for turning said disc when the cover section is moved in one direction, comprising a ratchet on said slidable cover section engageable with notches upon the rim of said disc, said ratchet and notches acting so that the ratchet idles over the notches when the cover section is opened and turns the disc when the cover section is closed.

3. A slice measuring device, comprising a base, a disc rotatively centrally supported on the base and adapted to support a cake or the like, a removable cover on said base for covering said cake and having a sector shaped opening, a slidable cover section on said cover for covering said sector shaped opening, a stop adjustably mounted on said cover for limiting opening of said slidable cover section to the size of the cut of said cake, and means for turning said disc when the cover section is moved in one direction, comprising a ratchet on said slidable cover section engageable with notches upon the rim of said disc, said ratchet and notches acting so that the ratchet idles over the notches when the cover section is opened and turns the disc when the cover section is closed, said ratchet being pivotally mounted and connected with a handle arranged to simultaneously control the operation of the ratchet and the opening and closing of the cover section, and means for holding said disc for free turning, comprising fixed ratchets engaging notches upon said disc.

4. A slice measuring device, comprising a base, a disc rotatively centrally supported on the base and adapted to support a cake or the like, a removable cover on said base for covering said cake and having a sector shaped opening, a slidable cover section on said cover for covering said sector shaped opening, a stop adjustably mounted on said cover for limiting opening of said slidable cover section to the size of the cut of said cake, and means for turning said disc when the cover section is moved in one direction, comprising a ratchet on said slidable cover section engageable with notches upon the rim of said disc, said ratchet and notches acting so that the ratchet idles over the notches when the cover section is opened and turns the disc when the cover section is closed, said ratchet being pivotally mounted and connected with a handle arranged to simultaneously control the operation of the ratchet and the opening and closing of the cover section, means for holding said disc for free turning, and means for urging said first ratchet into an inoperative position manually movable into an operative position.

5. A slice measuring device, comprising a base, a disc rotatably centrally supported on the base and adapted to support a cake or the like, a removable cover on said base for covering said cake and having a sector shaped opening, a slidable cover section on said cover for covering said sector shaped opening, a stop adjustably mounted on said cover for limiting opening of said slidable cover section to the size of the cut of said cake, and means for turning said disc when the cover section is moved in one direction, comprising a ratchet on said slidable cover section engageable with notches upon the rim of said disc, said ratchet and notches acting so that the ratchet idles over the notches when the cover section is opened and turns the disc when the cover section is closed, said ratchet being pivotally mounted and connected with a handle arranged to simultaneously control the operation of the ratchet and the opening and closing of the cover section, means for holding said disc for free turning, and means for urging said first ratchet into an inoperative position manually movable into an operative position, including a headed stud pivotally supporting the ratchet, and a spring acting between the head of the stud and ratchet to slidably urge the ratchet into the inoperative position.

6. A slice measuring device, comprising a base, a disc rotatively centrally supported on the base and adapted to support a cake or the like, a removable cover on said base for covering said cake and having a sector shaped opening, a slidable cover section on said cover for covering said sector shaped opening, a stop for limiting opening of said slidable cover section to the size of the cut of said cake, and means for turning said disc when the cover section is moved in one direction, comprising a ratchet on said slidable cover section engageable with notches upon the brim of said disc, said ratchet and notches acting so that the ratchet idles over the notches when the cover section is opened and turns the disc when the cover section is closed, said ratchet being pivotally mounted and connected with a handle arranged to simultaneously control the operation of the ratchet and the opening and closing of the cover section.

GEORGE W. RAPPOLD.